Patented Aug. 10, 1937

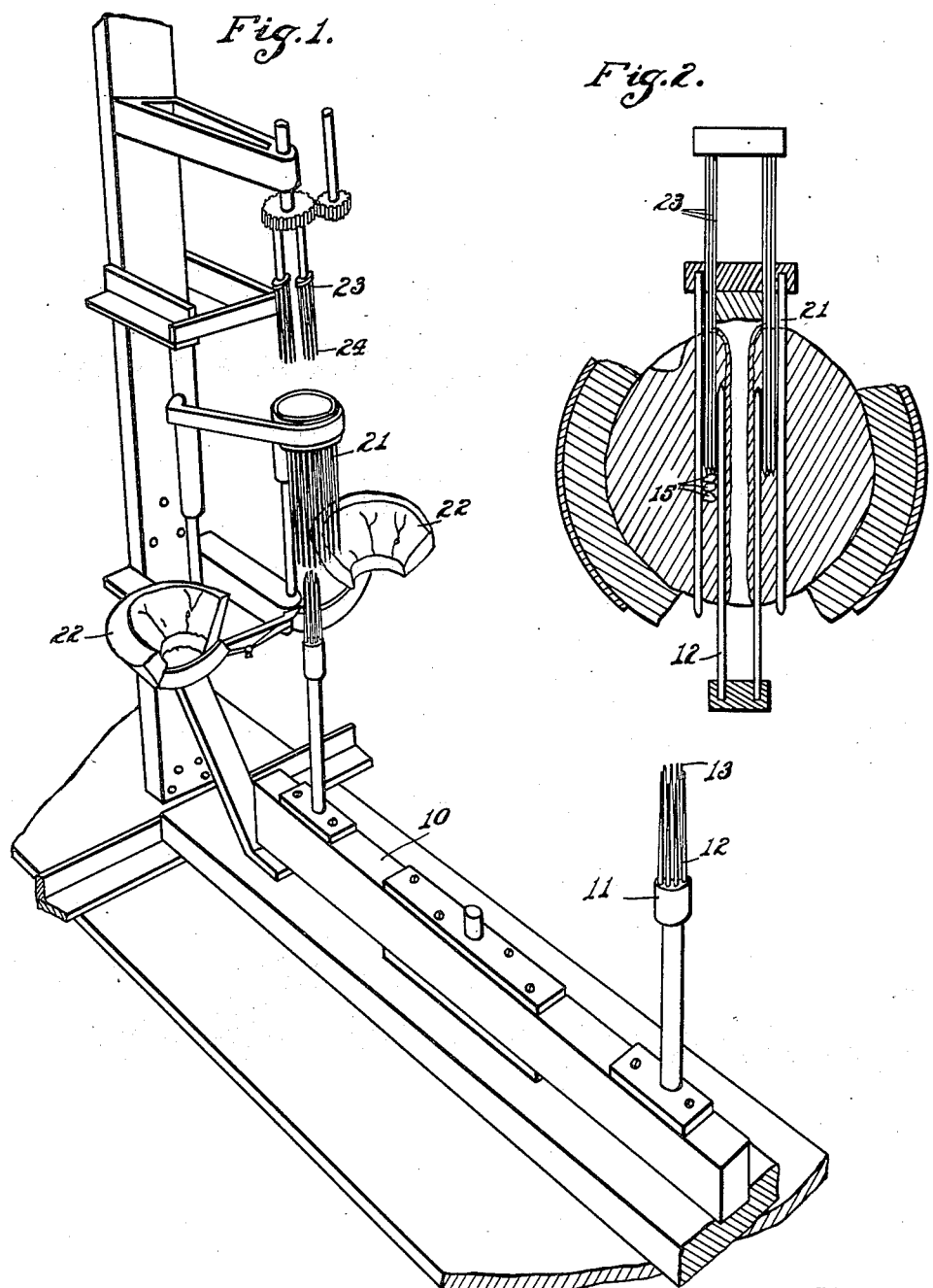

2,089,503

UNITED STATES PATENT OFFICE 2,089,503

MEANS FOR DESEEDING FRUITS

Ralph Polk, Jr., Haines City, Fla.

Original application August 2, 1935, Serial No. 34,346. Divided and this application April 24, 1936, Serial No. 76,098

4 Claims. (Cl. 146—3)

Citrus fruits comprise edible centers composed of groups of nature-formed definitely defined readily separable segments, the acceptable edible portion of each of which is enclosed in a tough integument. In many of such fruits there are seeds embedded with the juice cells within the apex of the segment integument.

In order that the acceptable portions may be satisfactorily packaged and preserved, it is necessary that the seeds be eliminated and it is quite desirable that seed elimination be accomplished prior to the separation of the acceptable portions, in order that the separation of the acceptable portions, as an integral juice cell group, may be accomplished. The problem of segregation is complicated by the fact that the number, angular extent and relative positions of the segments are variable in fruits of approximately the same size. In grapefruit the number of segments generally varies from 10 to 15.

The necessary segregation and seed elimination is now commercially accomplished by a tedious, relatively costly, hand manipulation which, obviously, must be reflected in the price at which the packaged product is offered to consumers.

The object of my present invention is to provide means whereby seed elimination may be effectively accomplished without disrupting the fruit, considered as a whole, and with a minimum loss of juice and with substantial maintenance of integrity of the juice cell groups.

The accompanying drawing illustrates my invention:

Fig. 1 is a perspective view of an apparatus embodying my improved device; and

Fig. 2 a medial polar section of a fruit with the seed confining and ejecting portions of my deseeding device in position.

In the drawing, 10 indicates a turn-table bearing a plurality of circumferentially-spaced forks 11, upon which the fruit is to be impaled along its polar diameter.

Fork 11 comprises an annular series of small tines 12, the upwardly-presented free end of each of which is tapered to form a small, smooth, rounded tip 13 which, under ordinary working conditions, will not pierce the radial portions of the segmental integuments 14 but will readily enter the juice cell groups within the apices of a plurality of said integuments.

These integuments comprise tough radial portions flaring outwardly from a medial line adjacent the polar diameter of the fruit.

The diameter of the annulus formed by the tines 12 is such that, for a graded size of fruit, the tines will penetrate the fruit just within the apices of the V's formed by the radial portions of the integuments and between the polar axis of the fruit and the annular region within which the seeds 15 lie.

The turn-table may be shifted to bring each fork successively to a charging station, a seed-extraction station, and a segment-segregating station.

The fruit, having preferably been divested of the major portion of its peeling and the circumferential parts of the integuments, by a suitable peeling operation which will avoid rupture of the adhesion bond between the radial portions of the integuments, is impaled, polar-wise, upon a fork and thence carried to a deseeding station where the polar diameter of the fruit is aligned axially with an annular series of depending tines 21 similar to but greater in number than the tines 12 and arranged in an annulus having a diameter such that the tines 21 may penetrate the fruit just outside the annular region of the seeds.

Prior to the penetration of the fruit by the tines 21, the fruit is preferably supported by a two-part cup composed of segments 22, 22 which may be swung into position beneath the fruit to support the same. The segmental cup portions 22 fit the lower hemisphere of the fruit and are preferably lined with sponge rubber.

When the fruit has been provided with the support of the cup segments 22, the annular series of tines 21 is projected downwardly through the fruit so that the seeds are confined between the inner annular series of tines 12 and the outer annular series of tines 21.

The seeds being thus radially confined may be readily forced polar-wise out of the fruit. For this purpose, I prefer to provide ejecting tines 23 which are similar to the tines 12 and 21 except that their tips 24 are preferably quite sharp so as to be capable of slightly penetrating the seeds. The tines 23 may, if desired, be arranged in a complete annular series having a diameter midway between the diameter of the groups of tines 12 and 21 but, in order to avoid possibility of too great disruption of the fruit, I prefer to arrange the tines 23 in one or more circumferentially spaced arc-shaped groups, as indicated in Fig. 1.

The tines 12, 21 and 23 are somewhat flexible laterally so as to be capable of accommodating themselves to the vagaries of arrangement of the radiating portions of the segment integuments, my experience being that by this arrangement, the segment integuments are not pierced or ruptured by movement of the tines into the fruit.

The tines of the several groups are slightly laterally spaced so as to afford room for the integuments therebetween, and the tines of the groups 12 and 21 are placed closely enough together to prevent radial passage of seeds therebetween.

The inner tines 12 restrain the seeds against radial movement toward the polar axis, thereby avoiding rupture of the integuments at their apices, and the tines 21 restrain the seeds against outward radial movement, thereby avoiding rupture of the juice cells by such outward movement.

This application is a division from my copending application Serial No. 34,346 filed August 2, 1935 for Apparatus for segmenting integument-free fruit segments.

I claim as my invention:

1. Means for deseeding naturally segmented fruits, comprising two arc-shaped concentric but radially-spaced groups of laterally spaced parallel pins capable of penetrating a fruit parallel with its polar axis respectively closely adjacent and upon opposite sides of the seed region relative to the fruit axis, and a third group of parallel laterally-spaced seed-engaging pins projectable between the two first-mentioned groups parallel therewith.

2. Means for deseeding naturally segmented fruits, comprising two arc-shaped concentric but radially-spaced groups of laterally spaced parallel pins capable of penetrating a fruit parallel with its polar axis respectively closely adjacent and upon opposite sides of the seed region relative to the fruit axis, and seed engaging means projectable axially between said pin groups.

3. Means for deseeding naturally-segmented fruits, comprising two annular, concentric, radially-spaced groups of laterally spaced parallel pins capable of penetrating a fruit parallel with its polar axis respectively closely adjacent and upon opposite sides of the seed region relative to the fruit axis, and a third group of parallel laterally-spaced seed-engaging pins projectable axially between the two first-mentioned groups.

4. Means for deseeding naturally-segmented fruits, comprising two annular, concentric, radially-spaced groups of laterally spaced parallel pins capable of penetrating a fruit parallel with its polar axis respectively closely adjacent and upon opposite sides of the seed region relative to the fruit axis, and seed-engaging means projectable axially between said pin groups.

RALPH POLK, Jr.